Patented Oct. 20, 1936

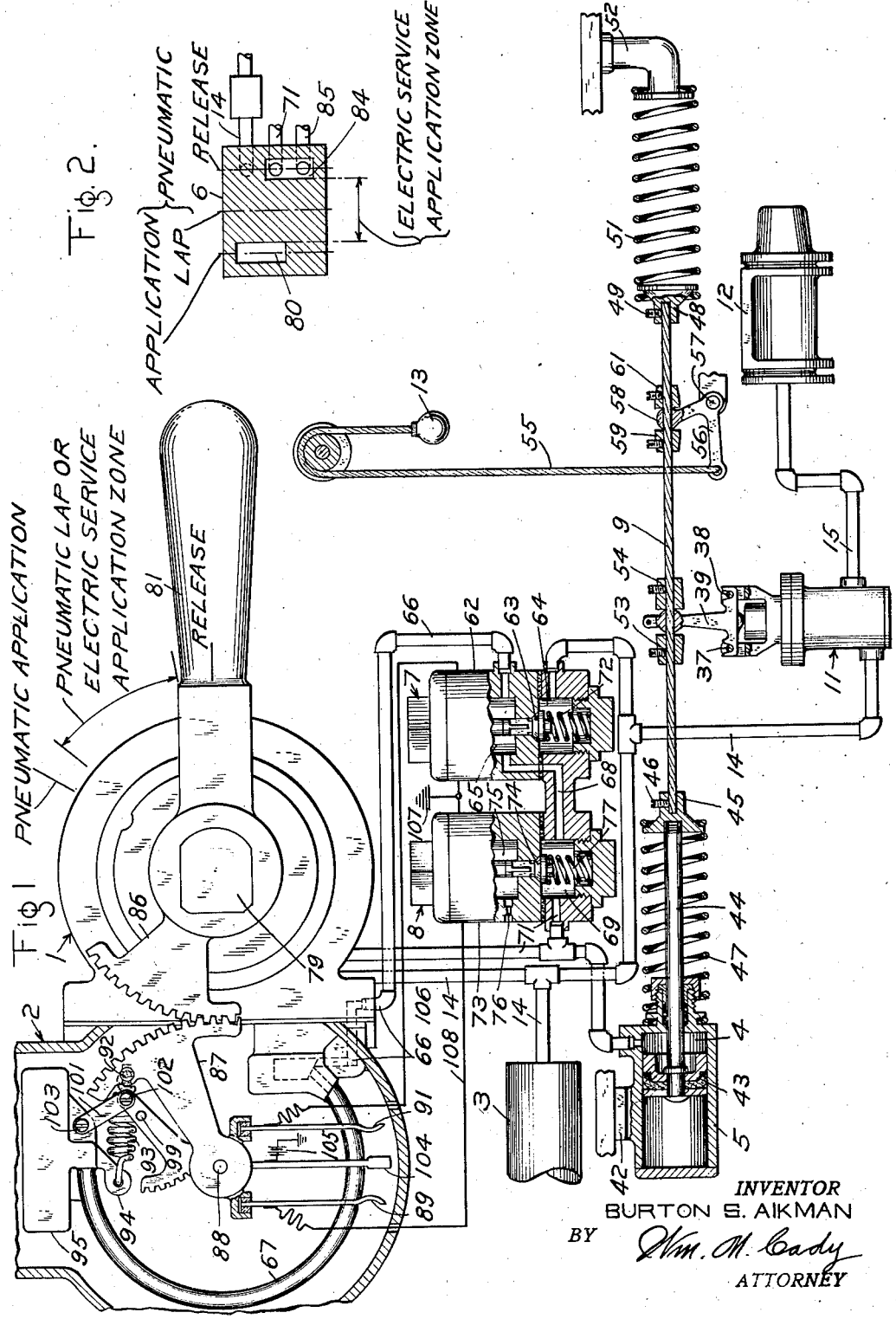

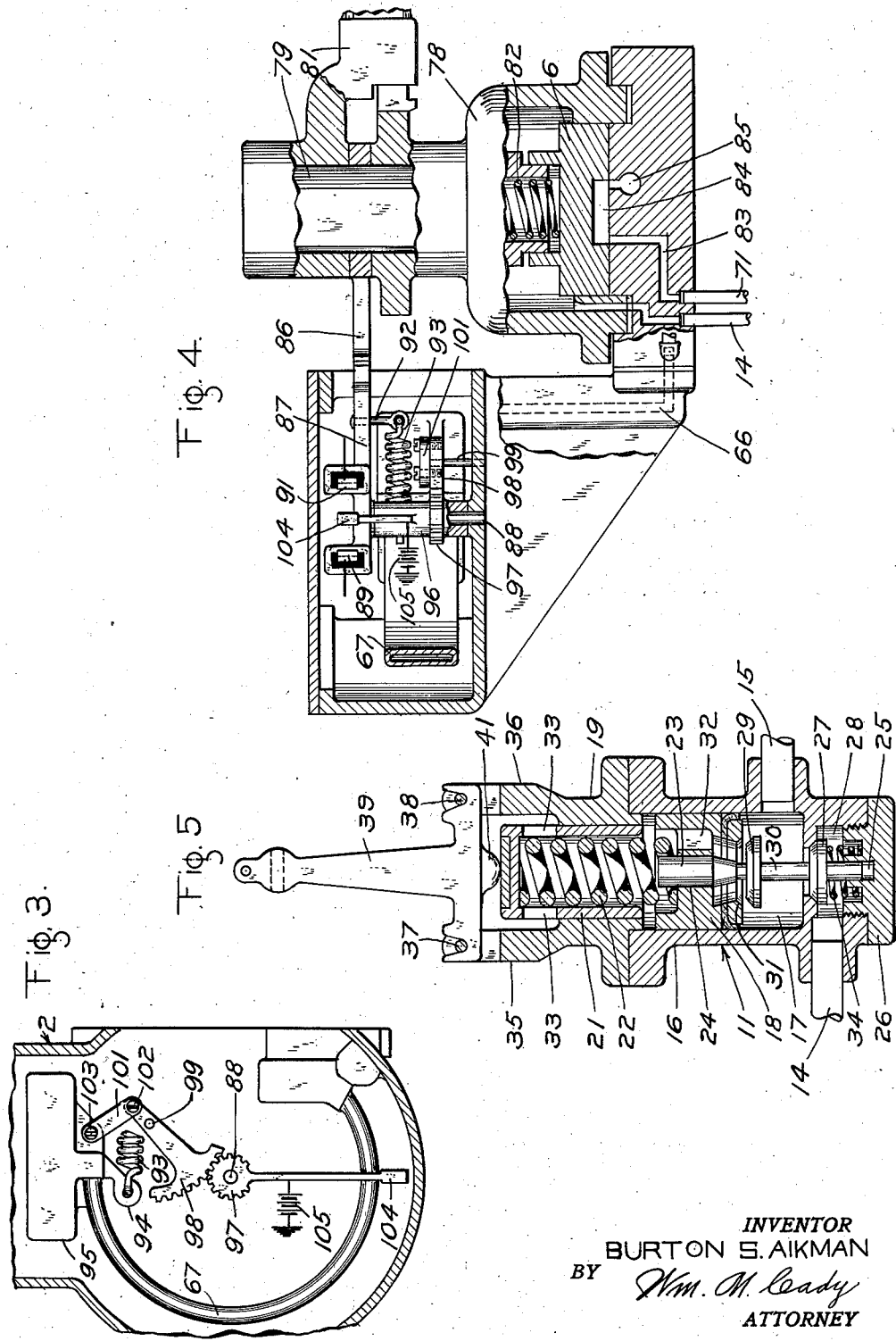

2,058,050

UNITED STATES PATENT OFFICE 2,058,050

BRAKING APPARATUS

Burton S. Aikman, Wilkinsburg, Pa., assignor to The Westinghouse Air Brake Company, Wilmerding, Pa., a corporation of Pennsylvania Application July 12, 1934, Serial No. 734,779

16 Claims. (Cl. 303—24)

My invention relates to braking equipment for vehicles and more particularly to electropneumatic braking equipment for high speed traction vehicles and railway trains.

In the operation of high speed trains and similar vehicles, it is desirable to provide a brake equipment having ample braking capacity to take care of the most rigid requirements the equipment will be called upon to meet. It is well known that for a given braking pressure friction type brakes are less effective in retarding the motion of a vehicle at high speeds than at low speeds because the coefficient of friction between the rubbing parts is lower at high speeds than at low speeds. In order to bring a vehicle to a stop quickly, it has been the usual practice for an operator to apply the brakes with a high degree of braking pressure at the high speeds and, as the speed of the vehicle decreases, to so operate the brakes as to cause the braking pressure to decrease in such manner that the vehicle is brought to a stop quickly and smoothly without dangerous shock or skidding of the wheels.

It is an object of my invention to provide a braking system in which the brake cylinder pressure during a brake application will be in direct proportion to the position of the brake control handle in its movement from release position to full application position.

It is another object of my invention to provide a braking system in which the rate of deceleration of the vehicle, up to a predetermined maximum permitted rate, may be obtained by the movement of the brake control handle toward its full application position, the rate of deceleration of the vehicle being automatically governed by the position of the operating handle.

It is a further object of my invention to provide a braking system in which a minimum amount of piping will be required for transmitting fluid under pressure to the brake cylinder, thus producing a system in which pipe friction is substantially reduced and in which a rapid rate of air flow to the brake cylinder will occur, and the likelihood of freezing during cold weather is largely eliminated.

A further object of my invention is to provide a braking system in which the brake application and releasing operation may be initiated either electrically, pneumatically, or manually.

A further object of my invention is the provision of control means for brake equipment having an electric control portion and a pneumatic control portion, both actuated by the same manually operable means for permitting ready use of the pneumatic portion to function to give a brake application or release as may be desired upon failure of the electric portion.

Further advantages and objects of my invention will appear from the following description of a specific preferred embodiment thereof taken in connection with the accompanying drawings, in which;

Fig. 1 is a diagrammatic view showing circuits and apparatus illustrating one preferred embodiment of my invention, Fig. 2 is a diagrammatic development of the rotary brake valve, Fig. 3 is a plan view of the deceleration controller with the upper gear segment and contacts removed, Fig. 4 is an elevational view, mainly in section, showing the brake valve and retardation controller, and Fig. 5 is a vertical sectional view of the application and release valve.

Referring to the drawings, and more particularly to Fig. 1 thereof, the brake equipment illustrated comprises a brake valve device 1 and a retardation control device 2 which cooperate to control the flow of fluid under pressure from the main reservoir 3 to the application chamber 4 of a brake application cylinder 5, either directly through the rotary valve 6, or through operation of the application magnet valve device 7, and from the application chamber 4 to the atmosphere, either through the rotary valve 6 or the release magnet valve device 8. The flow of fluid under pressure to or from the application chamber 4 causes actuation of a brake application cable 9 which operates an application and release valve 11 to control the flow of fluid under pressure from the main reservoir 3, through the reservoir pipe 14 to the brake cylinder pipe 15, and the brake cylinder 12, or from the brake cylinder 12 to the atmosphere. The brake application cable 9 may also be actuated by manually operable means 13 located on the vehicle at a point remote from the brake valve 1.

The application and release valve 11, for controlling communication between the reservoir pipe 14 and the brake cylinder pipe 15, and between the brake cylinder pipe 15 and the atmosphere, is best illustrated in Fig. 5 of the drawings and comprises a lower casing portion 16 and an upper casing portion 19. The lower casing portion defines an exhaust valve chamber 17 that is in open communication with the brake cylinder pipe 15, and which contains a movable abutment in the form of a piston 18. The upper casing portion 19 is provided with a central bore in which a tubular member 21, closed at its upper end and containing a spring 22, is slidably interfitted. The upper end of the spring 22 engages the closed upper end of the tubular member 21 and the lower end of the spring engages the piston 18. An exhaust valve 29 is provided, positioned in the chamber 17 and adapted to engage the valve seat 31 carried by the movable piston 18, for controlling communication between the chamber 17 and the atmosphere, through passage 32 leading upwardly through the piston 18 into the chamber enclosed by the tube 21, and through exhaust ports 33 to the atmosphere. The valve 29 is provided with an upwardly extending stem 23 interfitting in a bore 24 in the piston 18. An admission valve 27 is positioned in an admission valve chamber 28 in the lower part of the casing 16, for controlling communication between the chamber 28 and the exhaust valve chamber 17, and is provided with a stem 30, the upper end of which engages the under side of the valve 29, and the lower end of which is interfitted in a bore 25 in a cap nut 26 attached to the lower end of the casing portion 16. A spring 34 is provided in the admission valve chamber 28 for urging the admission valve 27 to its seat to cut off communication between the admission valve chamber 28 and the exhaust valve chamber 17. In the illustrated or release position of the valve device 11 the piston 18 is in such position that the exhaust valve 29 is unseated, thus effecting communication between the chamber 17 and the atmosphere through passage 32 and exhaust port 33. The casing portion 19 is provided with two upwardly extending arms 35 and 36 that support pivot pins 37 and 38, respectively, that are adapted to be engaged by grooves in the outwardly extending members of an operating lever 39 from which an operating portion 41 extends downwardly and is positioned in engagement with the closed end of the tube 21.

Upon operation of the lever 39 toward the right, or toward the left, the lever is fulcrumed about the pivot pin 37 or 38 to move the portion 41 downwardly against the end of the tube 21, thus compressing the valve spring 22, which exerts a downward pressure against the piston 18 moving the valve seat 31 into engagement with the exhaust valve 29 to close communication between the chamber 17 and the atmosphere. Further downward movement of the piston 18 causes the admission valve 27 to be moved downwardly to open communication between the main reservoir pipe 14 and the brake cylinder pipe 15, causing fluid under pressure to be admitted to the brake cylinder 12 to apply the brakes. The exhaust valve chamber 17 is subject to brake cylinder pressure and, as this pressure builds up, it exerts an increasing upward force against the lower side of the piston 18 to oppose the downward pressure of the spring 22 until the pressure within the chamber 17 reaches such a value as to move the piston 18 and the valve stem 23 upwardly to close communication between the admission valve chamber 28 and the exhaust valve chamber 17. The further the movement of the operating lever 39 from its illustrated or vertical position the greater will be the compression of the spring 22 causing the exhaust valve 29 to seat and the admission valve 27 to unseat, and, consequently, the greater will be the pressure within the exhaust valve chamber 17 and the brake cylinder 12 necessary to force the valves to lap position. It will be seen, therefore, that the application and release valve device 11 is self-lapping in accordance with brake cylinder pressure, and that the further the operating lever 39 is moved from its vertical or release position the greater will be the brake cylinder pressure required to operate it to lap position.

The brake application cylinder 5 and its piston 43 together act as a motor for operating the application and release valve 11, and are suitably supported from the frame of the vehicle by a supporting member 42. The brake application piston 43, provided in the application chamber 4, is connected by a rod 44 to a cap 45 that is attached by a set screw 46 to one end of the brake application cable 9. An anchorage spring 47 is provided about the rod 44, one end engaging the end of the brake application cylinder 5, and the other end engaging the cap 45. The other end of the brake application cable 9 is attached to a cap 48, by a set screw 49, that is connected to one end of an anchorage spring 51, the other end of which is attached to a bracket 52 that is supported from the frame of the vehicle. Stops 53 and 54 are fixedly attached to the brake application cable 9 on opposite sides of the operating lever 39 of the valve 11 in such position that, when no pressure exists in the application chamber 4, the action of the springs 47 and 51 will be such as to permit the operating lever 39 to be in its vertical or illustrated position. Manually operable means 13 is provided for also actuating the brake application cable 9 to operate the application and release valve 11, and is connected by a cable 55 to one end of a bell crank lever 56, pivotally mounted on the pin 57, the other end of which is provided with an opening through which the cable 9 extends and on opposite sides of which stops 59 and 61 are fixedly attached to the cable 9.

The application magnet valve device 7 is provided with an electromagnet 62 for actuating an application valve 63 for controlling communication between an application valve chamber 64 and an outlet chamber 65, the chamber 64 being in constant open communication with the main reservoir 3 through the reservoir pipe 14, and the chamber 65 being in open communication, through a pipe and passage 66, with the interior of a Bourdon tube 67 on the retardation control device 2. The chamber 65 is also in open communication through passage 68, release valve chamber 69, passage and pipe 71 with the application chamber 4 of the application cylinder 5. A spring 72 is provided in the application chamber 64 for urging the application valve 63 to its seated position to close communication between the chambers 64 and 65.

The release magnet valve device 8 comprises an electromagnet 73 for actuating the release valve 74 to control communication between the release valve chamber 69 and the exhaust chamber 75 that communicates through the exhaust port 76 with the atmosphere. A spring 77 is provided in the release valve chamber 69 for urging the release valve 74 to its seated position.

The brake valve device 1 comprises a casing 78 having a chamber containing the rotary valve 6 that is operatively connected to move upon its axis with the shaft 79, operated by the brake valve handle 81. The rotary valve 6 is pressed to its seat by a spring 82 on the lower end of the valve shaft 79. As best shown in Fig. 4, when the handle 81 is in release position the pipe 71 is connected to the atmosphere through passage 83 in the valve seat, groove 84 in the valve, and exhaust port 85. As best shown in Fig. 2, when the handle 81 is in application position the pipe 71 is connected to the reservoir pipe 14 through a port 80 in the valve 6.

The brake valve device also includes a gear segment 86, attached to and movable with the shaft 79 and provided with gear teeth for engaging teeth on a gear segment 87 of the retardation control device 2, that is pivotally supported on the pin 88 and carries electrical contact members 89 and 91. A pin 92 extends downwardly from the gear segment 87 and is fastened to one end of a spring 93, the other end of which is fastened to a lug 94 extending outwardly from the weight 95 that is attached to the outer end of the Bourdon tube 67. A sleeve 96 is pivotally mounted on the pin 88 beneath the gear segment 87, and is provided with a pinion 97 having gear teeth that engage the teeth of a gear segment 98, that is pivotally mounted on a pin 99 and adapted to be operated by a link 101, one end of which is fastened by the screw 102 to the end of the gear segment 98, and the other end of which is attached by the screw or pin 103 to the weight or inertia element 95. The sleeve 96 carries a contact member 104 that is connected to a source of electric energy, such as a battery 105, and is adapted to engage the contact members 89 and 91 carried by the gear segment 87. Upon engagement of the contact member 104 with the contact member 91 a circuit is completed from the battery 105 through contact members 104, 91, conductor 106, the winding of the magnet 62, to ground at 107 and to the grounded terminal of the battery 105. Upon engagement of the contact members 104 and 89, a circuit is completed from one terminal of the battery 105 through the contact members 104, 89, conductor 108, the winding of the magnet 73 to ground at 107 and to the grounded terminal of the battery 105.

The operation of the brake equipment will now be described. When the brake handle 81 is in its illustrated or release position the application chamber 4 is in communication with the atmosphere through pipe 71 and the exhaust port 85 of the brake valve, and the brake cylinder 12 is in communication with the atmosphere through the application and release valve 11 in the position illustrated in Fig. 5. If the operator moves the brake handle 81 from release position in a counterclockwise direction to apply the brakes, the first portion of this movement closes communication between the application chamber 4 and the atmosphere through the exhaust port 85 and the groove 84 in the rotary valve 6, and a slight further movement of the handle 81 causes sufficient rotation of the gear segment 87 to bring the contact member 91, carried thereby, into engagement with the contact member 104, thus completing a circuit through the winding of the magnet 62 of the application magnet valve device 7 to energize it and cause movement of the application valve 63 downwardly from its seat to effect communication between the valve chamber 64 and the chamber 65, thus admitting fluid under pressure from the reservoir 3 into the chamber 65. Fluid under pressure will flow from the chamber 65 through passage 68 to the release valve chamber 69, and passage and pipe 71, to the application chamber 4, and also from the chamber 65 through pipe and passage 66 into the Bourdon tube 67 causing its outer end to move upwardly and toward the left, thus actuating the gear segment 98 in a counterclockwise direction, and the pinion 97 and contact member 104 in a clockwise direction, to move the contact member 104 out of engagement with the contact member 91, thus deenergizing the winding of the magnet 62 and permitting the application valve 63 to seat.

As fluid under pressure is admitted to the application chamber 4, the brake application piston 43 is forced toward the left, thus actuating the brake application cable 9 and the lever 39 of the valve device 11 to exert pressure on the application valve main spring 22, and cause the piston 18 to be moved downwardly, seating the exhaust valve 29 to close communication between the exhaust valve chamber 17 and the atmosphere, and unseating the admission valve 27 to open communication between the main reservoir pipe 14 and the brake cylinder pipe 15 in the manner above described until the pressure within the exhaust valve chamber 17 reaches such value as to overcome the pressure of the spring 22, causing the admission valve 27 to again seat.

Upon the supply of fluid under pressure to the brake cylinder 12, the brakes are applied to decelerate the vehicle. During such deceleration, the inertia of the weight 95, and also the pressure within the Bourdon tube 67, both act on the weight 95 to move it slightly forward, or toward the left, thus actuating the gear segment 98 in a counterclockwise direction and the contact member 104 in a clockwise direction. If the rate of retardation of the vehicle is sufficient to move the contact member 104 into engagement with the contact member 89, the winding of the magnet 73 of the release magnet valve device 8 is energized, thus actuating the release valve 74 downwardly from its seat to effect communication between the release valve chamber 69 and the atmosphere through chamber 75 and exhaust port 76, to release fluid under pressure from the application chamber 4 of the brake application cylinder, and reduce the pressure on the application and release valve spring 22 to effect the release of fluid under pressure from the brake cylinder 12 an amount sufficient to decrease the retardation of the vehicle until the contact member 104 moves out of engagement with the contact member 89, to deenergize the winding of the release magnet valve device 8 due to the reduction in air pressure in the Bourdon tube 67, and the inward pull of the compensating spring 93.

The reduction in brake cylinder pressure reduces the pressure in the Bourdon tube, and at the same time, reduces the force on the spring 93, so that, upon a further increase in the rate of deceleration of the vehicle sufficient to again bring the contact member 104 into engagement with the contact member 89 to effect a further reduction in brake cylinder pressure, the necessary force on the spring 93 is brought about by a somewhat greater force of inertia of the weights 95 than was previously required when the brake cylinder pressure was at a higher value. This follows from the fact that a constant force must be exerted on the spring 93, for any given position of the contact members 89, in order to bring the contact member 104 into engagement with the contact member 89. Consequently, the sum of the forces acting against the spring 93 must be equal, and, as the force in the Bourdon tube 67 reduces, the force of inertia of the weight 95 must correspondingly increase in order to effect engagement of the contact members 89 and 104. The rate of retardation of the vehicle therefore increases slightly as the vehicle slows down due to the reduction in brake cylinder pressure, but the amount of this increase in the rate of retardation of the vehicle may be kept within the desired limits necessary to give a substantially constant rate of retardation of the vehicle.

It will be understood that the position of the operator's brake control handle 81 determines the position of the contact members 89 and 91 carried by the gear segment 87, and, consequently, the rate of retardation necessary to effect engagement between the contact members 104 and 89 to limit the degree of application of the brakes. The operator may at any time increase or decrease the permitted rate of deceleration of the vehicle by simply moving the position of the handle 81.

Should the electric circuits controlling the application and release magnet valve devices 7 and 8, respectively, fail, for any reason, the operator may, by movement of the handle 81 through the electric service application zone to the pneumatic application position operate the rotary valve 6 to effect communication between the reservoir 3 and the application chamber 4 as above described to effect a pneumatic application of the brakes. Positioning the handle 81 within the electric service application zone places the rotary valve 6 in pneumatic lap position, but in case of failure of the electric circuits the retardation controller is not operative to automatically control the rate of deceleration of the vehicle, since it effects such control only through operation of the electrically operated magnet valve devices 7 and 8.

When the brake handle 81 is in its pneumatic application position, or in any position within its electric service application zone, and a partial or full release of the brakes is desired, the operator may move the handle 81 toward the release position closing a circuit through contacts 104 and 89 to operate the release magnet valve device 8 to reduce the pressure within the brake cylinder and amount depending upon the position of the brake control handle 81. Any change in pressure in the application chamber 4 causes a corresponding change in the pressure on the application and release valve spring 22 and a corresponding change in pressure within the brake cylinder 12. The changes in pressure within the brake cylinder 12 closely follow those within the application chamber 4.

The release magnet valve device 8 is so designed that air is vented through the restricted exhaust port 76 at a much lower rate than it will be vented through the exhaust port 85 of the rotary valve 6 if the handle 81 is moved to the pneumatic release position, in which case a quick release of the brakes is effected. The release of fluid under pressure effected by operation of the retardation controller takes place at a restricted rate, while the release of fluid under pressure may be effected manually at a more rapid rate, if desired.

It may be noted that, should the brake application cable 9, or one of its anchorage springs 47 or 51 break, an operation of the application and release valve 11 to effect full brake application would result, since the anchorage springs 47 and 51 are normally under tension, and the one remaining connected to the operating lever 39 of the valve 11 when unopposed by the other anchorage spring, would operate the valve in the manner above described.

While I have illustrated and described one preferred embodiment of my invention, it will be apparent to those skilled in the art that many changes in the circuits and apparatus described may be made within the spirit of my invention, and I do not wish to be limited otherwise than by the scope of the appended claims.

Having now described my invention, what I claim as new and desire to secure by Letters Patent, is:

1. In a brake equipment for vehicles, in combination, a brake valve, contact members actuated thereby, pressure responsive means actuated in accordance with the degree of application of the brakes, contact means actuated thereby and cooperating with the contact members actuated by said brake valve for controlling the application and release of the brakes, and means responsive to the rate of deceleration of the vehicle for influencing said contact members.

2. In a fluid pressure brake for vehicles, in combination, a brake cylinder, means for controlling the supply of fluid under pressure to, and the release of fluid under pressure from, said brake cylinder comprising a manually operable member, electrical control means actuated thereby, a Bourdon tube subject to pressure that is responsive to the degree of application of the brakes, and control means actuated thereby, the contact means actuated by said manually operable means and the control means actuated by said Bourdon tube cooperating to control the degree of application or release of the brakes, and means responsive to the rate of deceleration of the vehicle for also influencing said Bourdon tube.

3. In a fluid pressure brake for vehicles, in combination, a brake cylinder, means for controlling the supply of fluid under pressure to, and the release of fluid under pressure from, said brake cylinder comprising a manually operable member, electrical control means actuated thereby, means for varying the operative effect of said electrical control means comprising a pressure responsive means subject to the degree of application of the brakes, and an inertia element carried thereby for biasing said pressure responsive means in accordance with the rate of deceleration of the vehicle.

4. In a brake equipment for vehicles, in combination, a manually operable control means and electrical control means actuated thereby for controlling the application and release of the brakes, means for automatically controlling the degree of application of the brakes comprising a curved tube subject to internal pressure and responsive to the degree of application of the brakes, and additional means for biasing said tube in accordance with the rate of deceleration of the vehicle.

5. In a brake equipment for vehicles, in combination, a manually operable control means and electrical control means actuated thereby for controlling the application and release of the brakes, means for automatically adjusting the braking force comprising a curved tube subject to internal pressure and responsive to the degree of application of the brakes, and a weight carried by the tube for biasing it in accordance with the rate of deceleration of the vehicle.

6. In a fluid pressure brake for vehicles, in combination, a brake cylinder, a manually operable control member and electrical control means actuated thereby for controlling the supply of fluid under pressure to, and the release of fluid under pressure from, said brake cylinder, means for adjusting the setting of said electrical control means to limit the brake cylinder pressure comprising a curved tube having a closed free end and subject to internal pressure that is responsive to brake cylinder pressure, and a weight carried by the free end of the tube for biasing it in accordance with the rate of deceleration of the vehicle.

7. In a fluid pressure brake for vehicles, in combination, a brake cylinder, a manually operable control member and electrical control means actuated thereby for controlling the supply of fluid under pressure to, and the release of fluid under pressure from, said brake cylinder, means for adjusting the setting of said electrical control means for limiting the brake cylinder pressure comprising a curved tube having a closed free end and subject to internal pressure that is responsive to brake cylinder pressure, and inertia responsive means operated in accordance with the rate of deceleration of the vehicle for also biasing said tube.

8. In a brake equipment for vehicles, in combination, a manually operable control member and electrical control means actuated thereby for controlling the application and release of the brakes, means for adjusting the setting of said electrical control means to limit the degree of application of the brakes comprising a curved tube having a closed free end and subject to internal pressure that is responsive to the degree of application of the brakes, and a weight carried by the free end of the tube for biasing it in accordance with the rate of deceleration of the vehicle.

9. In a brake equipment for vehicles, in combination, a manually operable control member and electrical control means actuated thereby for controlling the application and release of the brakes, means for adjusting the setting of said electrical control means to limit the degree of application of the brakes comprising a curved tube having a closed free end and subject to internal pressure that is responsive to the degree of application of the brakes, and inertia responsive means operated in accordance with the rate of deceleration of the vehicle for also biasing said tube.

10. In a brake equipment for vehicles, in combination, a manually operable control member and electrical control means actuated thereby for controlling the application and release of the brakes, means for adjusting the setting of said electrical control means to limit the degree of application of the brakes comprising a curved tube subject to internal pressure that is a measure of the degree of application of the brakes and having a closed free end for actuating said adjusting means, and an inertia responsive device operated in accordance with the rate of deceleration of the vehicle for also biasing said brake adjusting means.

11. In a fluid pressure brake for vehicles, a brake cylinder, fluid pressure means for controlling the flow of fluid under pressure to and from said brake cylinder, manually operable control means, means for adjusting the setting of said manually operable control means to limit the brake cylinder pressure comprising a curved tube having a closed free end and subject to internal pressure, said manually operable control means being effective to jointly control the flow of fluid under pressure to and from said fluid pressure means and to and from said curved tube.

12. In a fluid pressure brake, the combination with a brake cylinder, of valve means for controlling the supply of fluid under pressure to the brake cylinder, a member for operating said valve means, a fluid pressure motor for operating said member, manually controlled means for mechanically operating said member, and means for operating said valve means to supply fluid under pressure to the brake cylinder upon breakage of said member.

13. In a fluid pressure brake, the combination with a brake cylinder, of electrically controlled means for controlling the supply of fluid under pressure to the brake cylinder, electric contact members for controlling said electrically controlled means, a manually operable member for controlling the operation of said contact members, a Bourdon tube subject to fluid pressure which varies according to the pressure of fluid supplied to the brake cylinder, means operable by said Bourdon tube for also actuating said contact means, and means responsive to the rate of deceleration of the vehicle for modifying the operation of said contact means.

14. In a fluid pressure brake, the combination with a brake cylinder, of valve means for controlling the supply of fluid under pressure to the brake cylinder, a member for operating said valve means, a fluid pressure motor for operating said member, manually controlled means for mechanically operating said member, an inertia controlled device operative according to the rate of retardation of the vehicle for varying the braking force, and means for varying the rate of retardation at which said device operates according to the degree of pressure with which the brakes are applied.

15. In a fluid pressure brake, the combination with a brake cylinder, of electrically controlled means for controlling the supply of fluid under pressure to the brake cylinder, electric contact members for controlling said electrically controlled means, a manually operable member for controlling the operation of said contact members, a Bourdon tube subject to fluid pressure which varies according to the pressure of fluid supplied to the brake cylinder, means operable by said Bourdon tube for also actuating said contact means, an inertia controlled device operative according to the rate of retardation of the vehicle for varying the braking force, and means for varying the rate of retardation at which said device operates according to the degree of pressure with which the brakes are applied.

16. In a fluid pressure brake, the combination with a brake cylinder, of valve means for controlling the supply of fluid under pressure to the brake cylinder, means operable upon movement in opposite direction for operating said valve means including an operating element, motor means for operating said element in one direction, means for operating said element in the opposite direction, and resilient means for operating said element and thereby said valve means upon breakage of said element either between said motor means and the valve means or between the other element operating means and the valve means.

BURTON S. AIKMAN.